United States Patent [19]
McDermott, III

[11] 4,254,492
[45] Mar. 3, 1981

[54] REDUNDANT CLOCK SYSTEM UTILIZING NONSYNCHRONOUS OSCILLATORS

[75] Inventor: Thomas C. McDermott, III, Plano, Tex.

[73] Assignee: Rockwell International Corporation, El Segundo, Calif.

[21] Appl. No.: 25,816

[22] Filed: Apr. 2, 1979

[51] Int. Cl.³ .................. G04F 8/00; G04B 17/12; H03B 27/00
[52] U.S. Cl. .................. 368/119; 368/200; 331/49
[58] Field of Search .......... 58/23 AC, 24 R; 307/149, 219, 260, 269; 328/61, 71; 331/46, 49; 368/119, 200, 155–157

[56] References Cited
U.S. PATENT DOCUMENTS

| | | | |
|---|---|---|---|
| 3,431,510 | 3/1969 | Reis et al. | 331/49 |
| 3,599,111 | 8/1971 | Butler, Jr. et al. | 331/49 |
| 3,628,158 | 10/1971 | Sjoquist | 331/49 |
| 3,708,686 | 1/1973 | Butler, Jr. et al. | 307/149 |
| 4,156,200 | 5/1979 | Gomez | 328/61 |

*Primary Examiner*—Vit W. Miska
*Attorney, Agent, or Firm*—V. Lawrence Sewell; Howard R. Greenberg; H. Fredrick Hamann

[57] ABSTRACT

A clock system is disclosed having two identical clocks not synchronized with each other. Each of the clocks includes a circuit for selecting the output of one of the clocks as the present system output. Further, each clock includes logic for detecting errors in the operation of itself, and of the other. When an error is detected in the operation of the clock selected to be the present system output, a switchover sequence control switches the output signal of the nonselected clock to become the new system output. The switchover sequence control includes a feature which ensures that the interval between pulses in the system output is greater than a predetermined period in order to minimize detrimental effects on circuitry utilizing the clock system output.

18 Claims, 6 Drawing Figures

REDUNDANT CLOCK SYSTEM UTILIZING NONSYNCHRONOUS OSCILLATORS

BACKGROUND OF THE INVENTION

This invention relates to electronic clocks and particularly to clocks of the type used to establish the timing of events in digital systems.

SUMMARY OF THE INVENTION

In accordance with the present invention, there is provided a clock system with two nonsynchronized digital clocks, each having a select circuit for selecting the output signal of one of the clocks to be the present output of the system. Each clock has logic capable of detecting errors in the operation of the other clock. Each clock additionally has a switchover control for selecting the other output signal to be the system output when an error is detected in the presently selected clock. The switchover control includes means for ensuring that the interval between pulses in the system output remains greater than a predetermined period.

The two clocks of the system of the invention can be embodied as two separate identical circuit cards. The isolation of the two clocks thus achieved improves the possibility that one can continue proper operation when the other experiences a malfunction.

One of the advantages of the present invention is economic. The present clock system avoids the use of circuitry necessary to achieve synchronization of its two clocks.

In a preferred embodiment, the process of switchover from a malfunctioning clock to the other clock includes the step of freezing the output of the malfunctioning clock in its present logical state. This avoids the possibility of continuing to send a mixture of good and bad clock pulses to a utilizing circuit such as a processor. The switchover sequence also preferably includes resetting the output of the frozen clock to a known state and then waiting at least one clock cycle before selecting the good clock output to become the system output. The wait period prevents any occurrence of system output pulses separated by an interval shorter than the proper clock interval. Clock pulses occurring too frequently could produce an indeterminate state in the logic of a circuit utilizing the clock system output.

It is a feature of the clock system of the invention that a malfunctioning clock does not try to stop itself nor to alter the state of the other clock. It is the clock which is not selected as the system output that commands the switchover to itself upon recognition of a system output failure.

DESCRIPTION OF A PREFERRED EMBODIMENT

Figure 1:
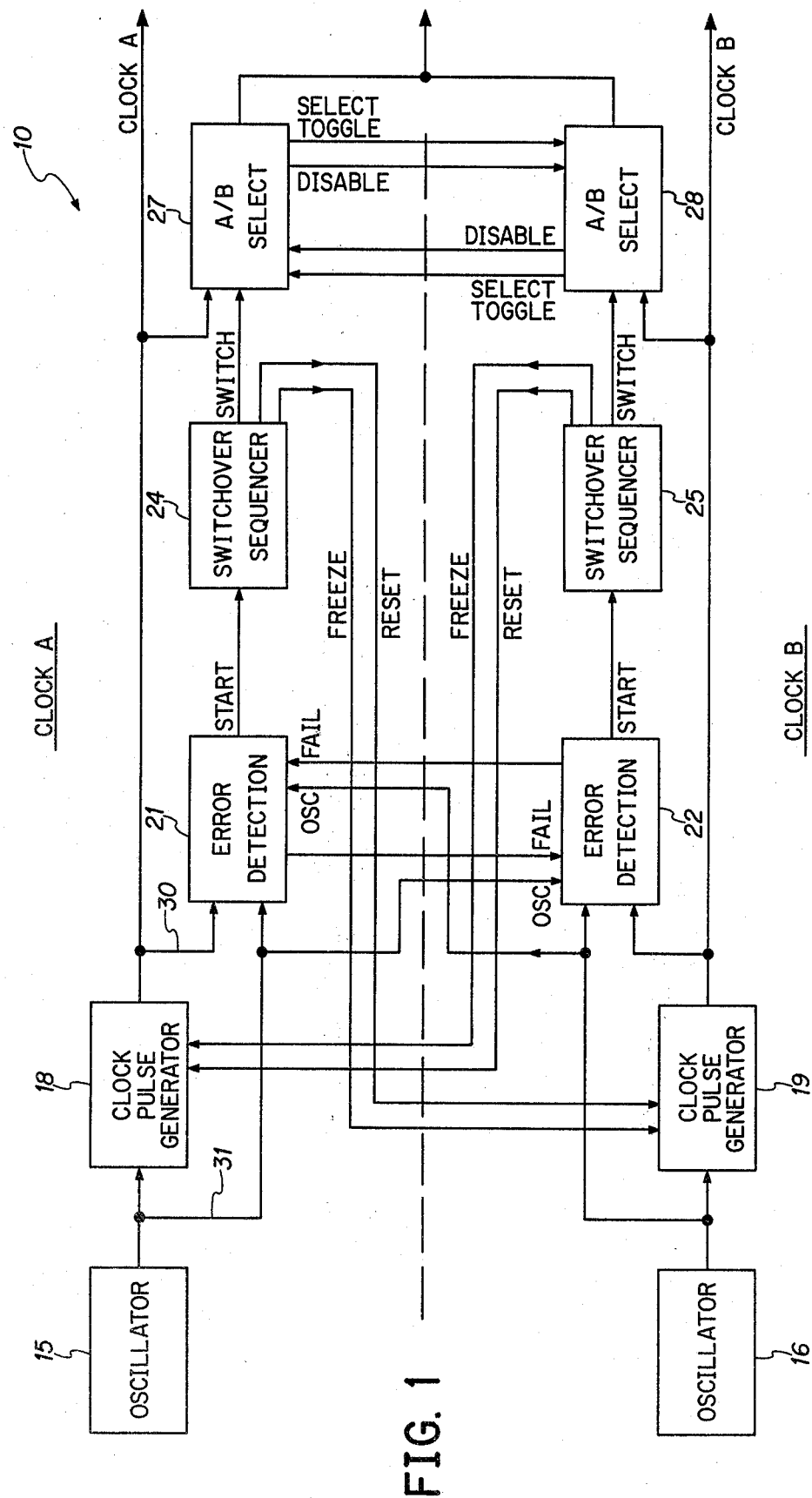
FIG. 1 is a block diagram of a clock system according to the invention.

FIG. 1 shows a block diagram of a clock system according to the invention, indicated generally by the reference numeral 10. The clock system 10 is comprised of two electronic clocks A and B. The clocks are preferably fabricated as two separate identical circuit cards. The clocks A and B include, respectively, oscillators 15 and 16, clock pulse generators 18 and 19, error detection logic 21 and 22, switchover sequence controls 24 and 25 and A/B select logic 27 and 28.

In the absence of a malfunction, each of the oscillators 15 and 16 drives its associated clock pulse generator 18 and 19 to output a correct clock pulse train. The two clock pulse outputs are not synchronized with respect to each other. One of the clocks A and B is selected for utilization as the clock system output by the A/B select circuits 27 and 28.

In the event a fault occurs in one of the clocks, other portions of the clock system 10 become active. In clock A, error detection logic 21 is responsive to errors in the output 30 of clock pulse generator 18 or output 31 of oscillator 15 to generate a FAIL signal which is received by error detection logic 22 of clock B. Additionally, error detection logic 21 receives the FAIL signal from clock B and the output of oscillator 16 of clock B. If it is the output of clock B which is selected as the present output of clock system 10, and error detection logic 21 receives a FAIL signal from clock B or detects an error in the output of oscillator 16, then detection logic 21 signals switchover sequence control 24 to start.

Switchover sequence control 24 begins a sequence of events selecting the output of clock A to become the output of system 10. Control 24 sends signals to clock pulse generator 19 to freeze the output of clock B in its present logic state and then to reset the output of clock B to a known state. Finally, switchover sequence control 24 signals A/B select circuit 27 to begin the switch to clock A. Select circuit 27 produces an output selecting clock A and also sends a select toggle to A/B select circuit 28 in clock B to change its output to one which selects clock A. Then, A/B select circuit 27 disables select circuit 28 in clock B as a precaution to prevent a malfunctioning select circuit 28 from exerting any control over the selection of the clock system output.

Figure 2:
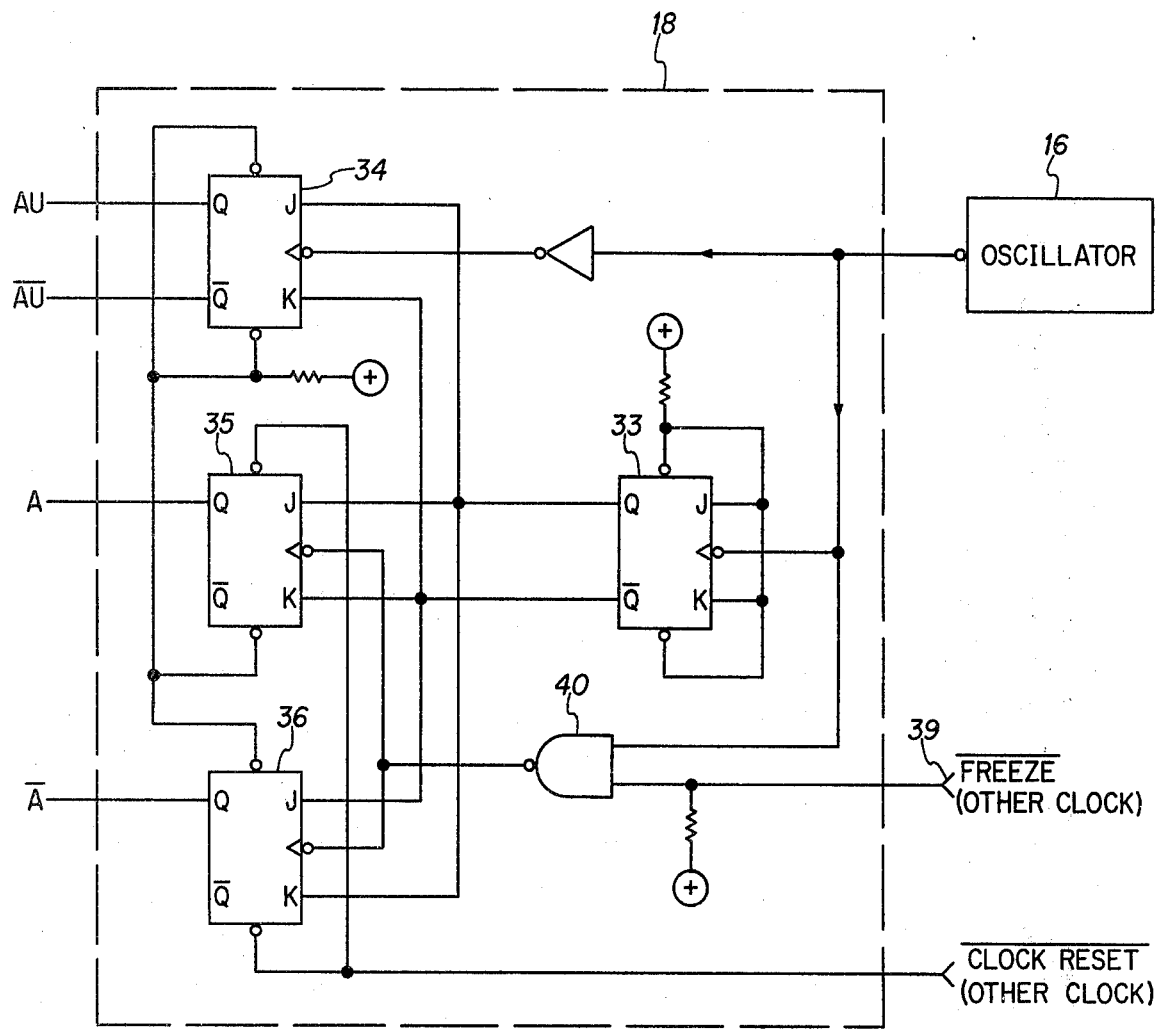
FIG. 2 is a logic diagram of a clock pulse generator of the system of FIG. 1.

FIG. 2 illustrates several features of clock pulse generator 18 and identical generator 19. The output of oscillator 16 is applied to the clock input of flip-flop 33 which has both the J and K inputs held high. This causes the Q and $\overline{Q}$ outputs of flip-flop 33 to produce square waves at one-half the rate of oscillator 16. The Q output of flip-flop 33 is applied to the J inputs of flip-flops 34 and 35 and the K input of flip-flop 36. The $\overline{Q}$ output of flip-flop 33 is applied to the K inputs of flip-flops 34 and 35 and the J input of flip-flop 36. As a result, the Q output of flip-flop 35 is a square wave at one-half the rate of oscillator 16. This Q output of flip-flop 33 is labeled A in the drawing and is the basic output of clock A. The Q output of flip-flop 36 is $\overline{A}$, the complement of the output of clock A.

The separate flip-flop 36 is utilized to provide the complementary output $\overline{A}$, instead of simply taking the $\overline{Q}$ output of flip-flop 35. This is done so as to eliminate the time skew which can occur between the Q and $\overline{Q}$ outputs of one of these flip-flops. The use of the circuit employing flip-flops 35 and 36 produces a much closer time coincidence between the leading edges of the outputs A and $\overline{A}$ than would be expected from the Q and $\overline{Q}$ outputs of, say, flip-flop 35.

When a $\overline{\text{FREEZE}}$ signal is received at input 39 during a switchover sequence, the output of oscillator 16 is uncoupled by the action of AND gate 40 from the clock inputs of flip-flops 35 and 36. By contrast the connection of oscillator 16 to the clock input of flip-flop 34 is not gated and continues despite the occurrence of a $\overline{\text{FREEZE}}$ signal. The outputs of AU and $\overline{\text{AU}}$ of flip-flop 34 comprise unfreezable versions of the outputs of clock A, which can be used to continue to clock events in clock A itself, even after the receipt of a $\overline{\text{FREEZE}}$ signal.

Figure 3:
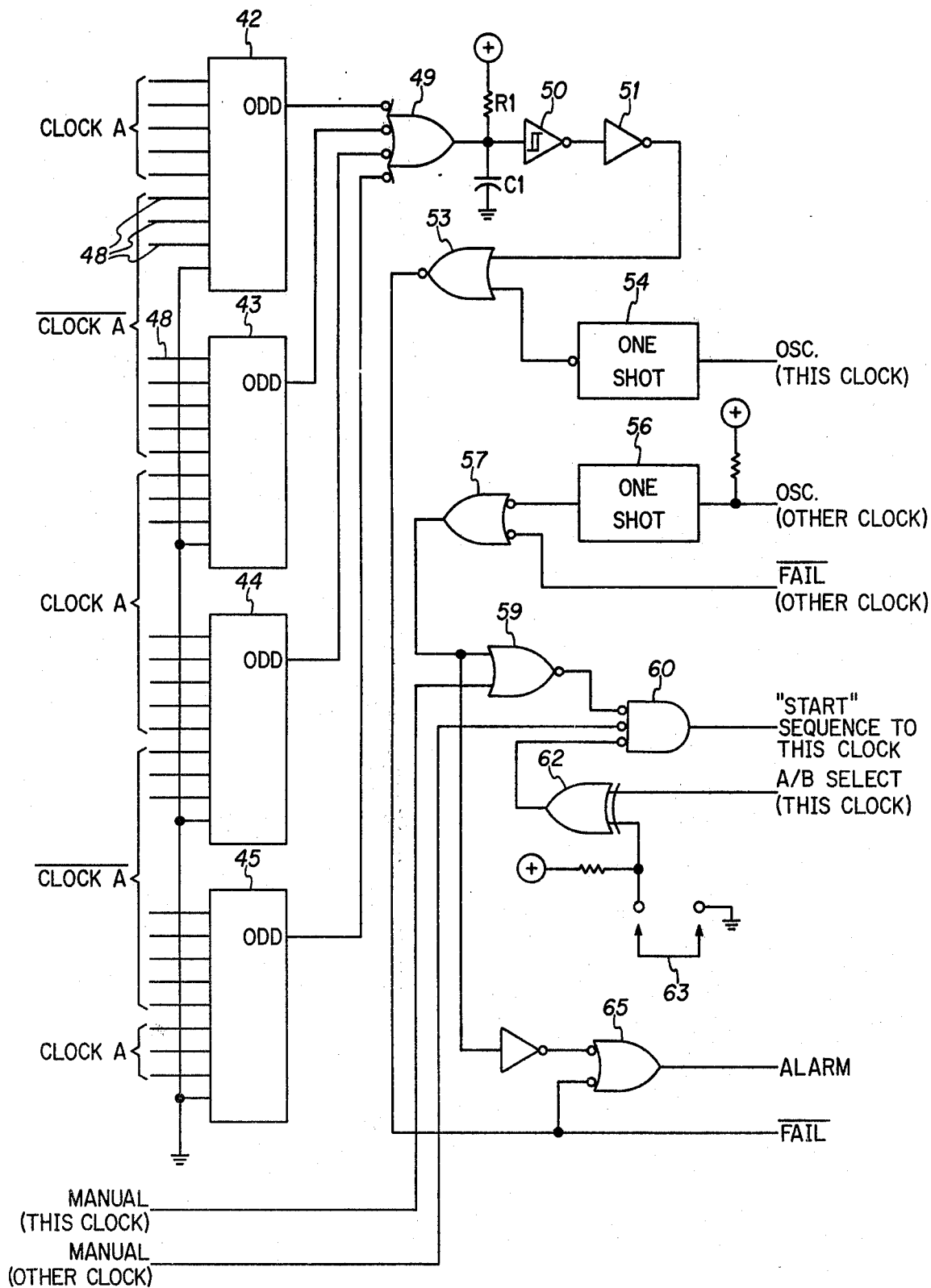
FIG. 3 is a logic diagram of an error detection logic unit of the system of FIG. 1.

FIG. 3 shows the details of error detection logic 22. The output of clock A is monitored by parity checkers 42–45. The multiple inputs labeled CLOCK A and $\overline{\text{CLOCK A}}$ correspond to the practical situation in which the signal A of FIG. 2 is input to a number of drivers in order to fan out the clock to multiple circuit boards utilizing it. Each of the inputs in FIG. 3 labeled CLOCK A or $\overline{\text{CLOCK A}}$ corresponds to an output of one of such multiple drivers.

To illustrate the operation of the parity checkers, assume that the five CLOCK A inputs to parity checker 42 are in the true state, while the three $\overline{\text{CLOCK A}}$ inputs are in the false state. This will cause the odd parity output of checker 42 to be true. When the clock switches to its other state, wherein all the $\overline{\text{CLOCK A}}$ inputs are true, the five (note) CLOCK A inputs will be false. Again, the odd parity output of checker 42 will be true. Thus it is that the odd parity output of checkers 42–45 should always be true, so long as the outputs from clock A are operating properly.

The inputs to parity checkers 42–45 are particularly grouped to be sensitive to the failure of a single driver chip containing eight drivers. Thus, if inputs 48 hang in the false state, then the odd parity output of checker 42 will go false when its CLOCK A inputs all go false. If the inputs 48 hang in the true condition, then the odd parity output of checker 43 will go false, when its CLOCK A inputs go true. It can be understood that the arrangement as disclosed is preferable to one in which each checker has four inputs from one driver chip and four driver inputs from another or eight inputs from one driver chip, in which case single driver chip failures would not be detected.

The odd parity outputs of checkers 42–45 are input to gate 49 (OR with inverted inputs) which will product a true output if any of the odd parity outputs goes false. With such an arrangement, slight time misalignments of the CLOCK A and $\overline{\text{CLOCK A}}$ inputs to parity checkers 42–45 can result in undesired narrow pulses at the output of gate 49 when there is no real parity error which should be detected. To eliminate the effect of such pulses, the output of gate 49 is filtered by a resistor R1 and capacitor C1. For example, resistor R1 can be 1.2 kilohms, while capacitor C1 is 1000 pF. With this filtering, the output of gate 49 is applied to the input of Schmitt Trigger 50. Any false pulses will lie below the threshhold for triggering Schmitt Trigger 50, so that only true indications of incorrect parity will appear at its output. The reliability of these indications is also enhanced by the use of a slower gate, such as a low power Schottky device, for gate 49.

The output of Schmitt Trigger 50 is applied through inverter 51 to gate 53. The other input to gate 53 is the false output of one-shot 54. One-shot 54 has as its input the output of the oscillator of the same clock as the error detection logic. In other words, for error detection logic 22, the output of oscillator 16 would be applied to one-shot 54. One-shot circuit 54 is retriggerable and is designed with an output pulse width which is at least greater than one interval of the oscillators of the clocks A and B. As a result, so long as the oscillator output continued to trigger one-shot 54, its output stays false. If the oscillator fails for a period longer than the output pulse width of the one-shot, the output of circuit 54 will return to the true state. If the period of the output pulse of one-shot 54 is made several oscillator periods long, then the oscillator of the clock is permitted to miss more than one output cycle before an error is detected.

Either the occurrence of a parity error detected by checkers 42–45 or an oscillator error detected by one-shot 54 will cause a false pulse labeled $\overline{\text{FAIL}}$ from NOR gate 53. This is an output of the error detection logic, which is provided to the error detection logic of the other clock.

The error detection logic of FIG. 3 receives, from the other clock, its oscillator output and $\overline{\text{FAIL}}$ signal. The output of the oscillator from the other clock is the input of a retriggerable one-shot 56, which can have an output pulse period which is the same as that for one-shot 54, for example. The true output on one-shot 56 is applied to gate 57 (OR with inverted inputs), which has as its other input the $\overline{\text{FAIL}}$ signal from the other clock. If the oscillator of the other clock falters, the output of one-shot 56 will cease being true, and gate 57 will apply a true input to NOR gate 59. Gate 57 will also generate a true output, if gate 57 receives a $\overline{\text{FAIL}}$ pulse from the other clock.

Upon receipt of the true input from gate 57, gate 59 applies to gate 60 (AND with inverted inputs), one of the false inputs necessary to start the switchover sequence to this clock. Gate 59 also receives as one input thereof a MANUAL indication from the same clock. If the MANUAL indication is true, it indicates that a switch has been used to manually select the output of this clock as the output of clock system 10. When the MANUAL indication is true, it causes gate 59 to produce a false output.

Gate 60 has as one of its other inputs the MANUAL indication from the other clock. It is one of the conditions for a true output from gate 60 that the MANUAL indication from the other clock be false; that is, that the other clock is not manually selected.

The remaining input to gate 60 is from exclusive OR gate 62. One of the inputs to gate 62 is from A/B select logic of the same clock. As will be described in more detail hereinafter, a true output from the A/B select logic will be taken to correspond to the selection of the clock A output to be the system output, while false selects clock B. In accordance with this convention, jumper 63 will be connected for the error detection logic 21 of clock A and not connected for detection logic 22 of clock B. By way of example, assume that jumper 63 is connected, holding one input of gate 62 low (false). In this situation, A/B SELECT must be false in order for gate 62 to provide a false output.

Thus, gate 60 will start the switchover sequence to this clock, when it receives a failure indication from the other clock by way of gate 59, an output from gate 62 indicating that the other clock is presently automatically selected to provide the system output, and an indication that the other clock is not manually selected as system output. Gate 65 (OR with inputs inverted)

produces an ALARM indication upon the detection, at gates 53 and 57, of an error from either clock.

Figure 4:
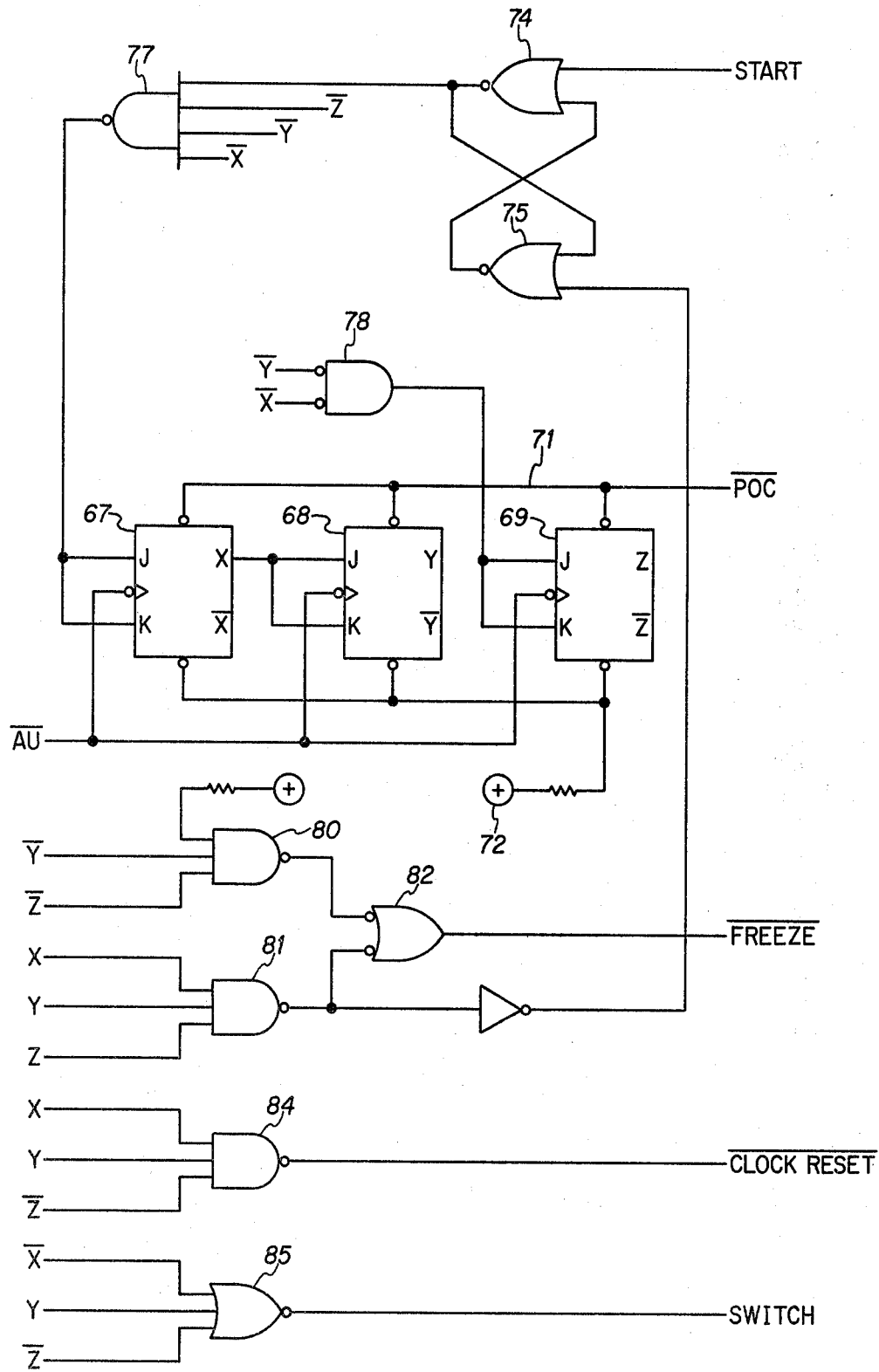
FIG. 4 is a logic diagram of a switchover sequence control of the system of FIG. 1.

FIG. 4 illustrates the structure of switchover sequence control 24 or 25. The states of the switchover sequence can be numbered with outputs X, Y and Z of flip-flops 67, 68 and 69, with Z being the most significant bit of the state number, Y the next most significant bit and X the least significant bit.

A false power-on-clear signal 71 is applied to the preset inputs of the flip-flops. A positive potential 72 pulls up the clear inputs of the flip-flops. As a result of the preset and clear interaction, the flip-flops 67-69 begin with X, Y and Z true, that is, in the 111 state. Then they all toggle to the 000 resting state on the occurrence of the next clock pulse and remain there until a START pulse is received.

The switchover sequence is begun by the occurrence of a START pulse at an input of NOR gate 74. This pulse is received from the output of an error detection circuit, namely gate 60 (in FIG. 3). NOR gates 74 and 75 are interconnected to form a latch which is switched upon the occurrence of the START pulse. At this time, the latch applied a false input to NAND gate 77. The other inputs to gate 77, $\overline{X}$, $\overline{Y}$ and $\overline{Z}$, are all true, since the flip-flops are in the 000 state. As a result, the output of gate 77 is switched to become true. This in turn applies a true input to the J and K inputs of flip-flop 67, causing X to toggle true on the occurrence of the next clock pulse, and moving the sequence control to state 001.

The J and K inputs of flip-flop 67 are held true throughout the switchover sequence, so it continues to be toggled upon each clock pulse. The J and K inputs of flip-flop 68 derive from X, so that the flip-flop is toggled on every other clock pulse. Thus, the flip-flops count through the states 000, 001, 010 and 011. At state three (011), gate 78 (AND with inputs inverted), with $\overline{X}$ and $\overline{Y}$ at its inputs, applies a true input to the J and K inputs of flip-flop 69, because X and Y are both true. This causes the transition from the 011 state to the 100 state. Subsequently, the circuit sequences through states 101, 110, 111 and finally back to 000.

The $\overline{FREEZE}$ output of the sequence control is provided by gates 80, 81 and 82. The output of gate 82 (OR with inverted inputs) first goes false at state two (010), when the $\overline{Y}$ input to NAND gate 80 becomes false. The effect of $\overline{FREEZE}$ on the clock pulse generator can be seen in FIG. 2. There it can be seen that when input 39 to gate 40 goes false, flip-flops 35 and 36 no longer are clocked by oscillator 16. As a result, the outputs A and $\overline{A}$ stop changing.

In the next state three (011), the combination of X, Y and $\overline{Z}$ at the input of NAND gate 84 causes $\overline{CLOCK\ RESET}$ to go false. Referring again to FIG. 2, it can be seen that $\overline{CLOCK\ RESET}$ is applied to the preset input of flip-flop 35 and to the clear input of flip-flop 36 in the clock pulse generator of the other clock. The effect is to drive the clock outputs to a known state. The A output goes to the false condition, while the $\overline{A}$ output goes true.

In state four (100), $\overline{CLOCK\ RESET}$ returns to a true condition, having reset the other clock. In state five (101) the inputs $\overline{X}$, Y and $\overline{Z}$ to NOR gate 85 cause the output SWITCH to go true. The SWITCH signal goes to the A/B select logic 27 or 28 of the same clock. It causes the output signal of the same clock to become the clock system output. The detailed action of this signal will be considered in the description of FIG. 5. In the next state, six (110), SWITCH returns to false.

When state seven (111) the true X, Y and Z inputs to NAND gate 81 cause $\overline{FREEZE}$ to return to the true condition. In addition, the output of gate 81 is inverted and applied to NOR gate 75. The resultant input causes the latch formed of gates 74 and 75 to switch. This latch is then in a condition to receive a new START signal. On the next clock cycle, flip-flops 67-69 return to state zero (000).

Figure 5:
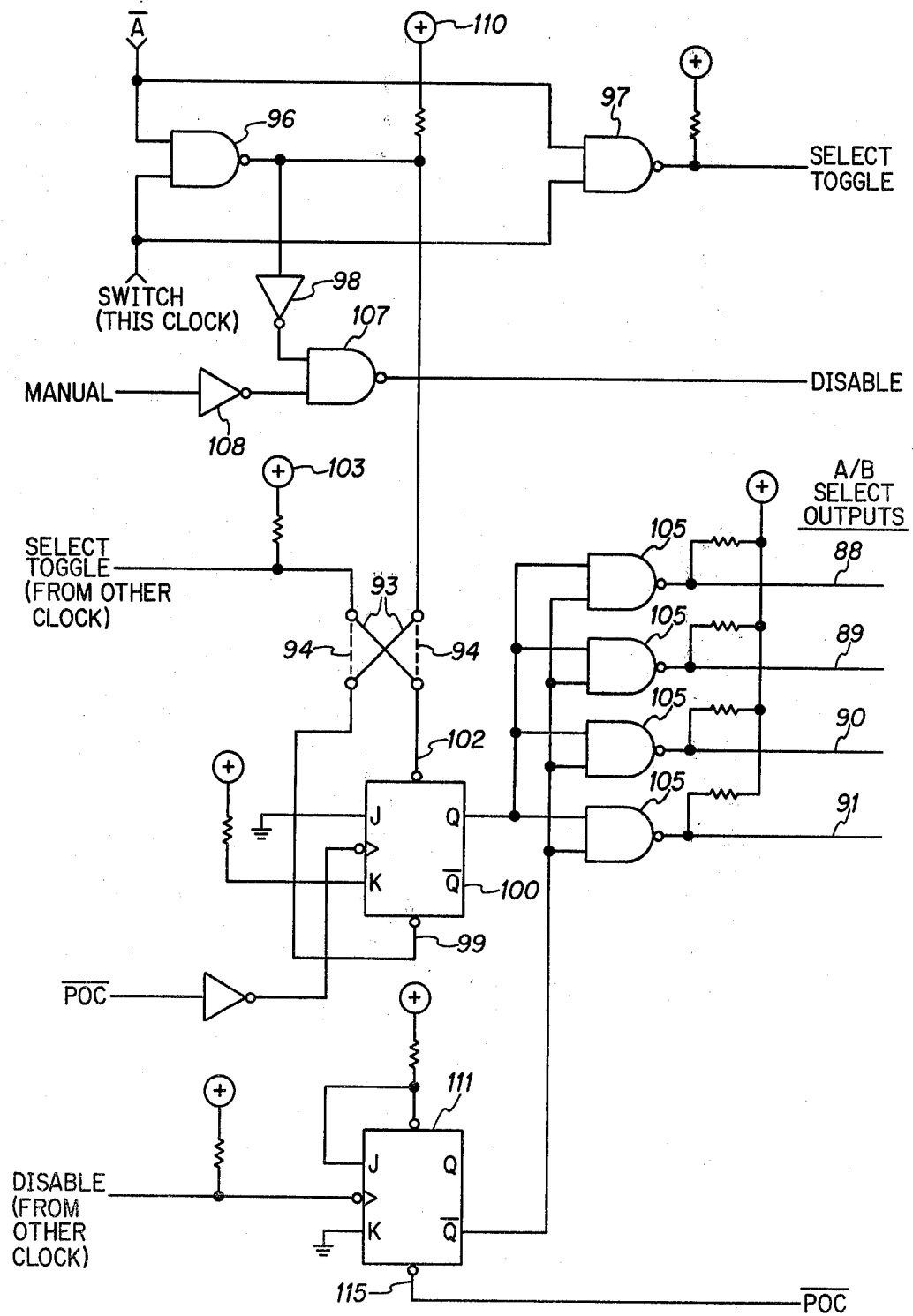
FIG. 5 is a logic diagram of an A/B select logic unit of the system of FIG. 1.

FIG. 5 shows in detail the A/B select logic 27 or 28. The select logic has a plurality of outputs, indicated in FIG. 5 by four outputs 88-91. Each output, for example, output 88 would be connected to an identical output in the A/B select logic of the other clock. Then, the two connected select logic outputs from the two clocks are connected to circuitry, often on another circuit card, which is to utilize the output of clock system 10. The output of each clock A and B also runs to the utilizing circuitry, and a switch there selects the output of one of the clocks as the output of system 10. The switch is controlled by the A/B select logic output.

In the description herein, the convention will be adopted that the outputs of the A/B select logic go true (high) to select clock A and false (low) to select clock B. Jumpers 93 are shown in a position proper for clock A. For clock B, the jumpers would be in the positions 94 shown by broken lines.

When the circuit of FIG. 5 receives a SWITCH signal from the switchover sequence control of the same clock, the output of NAND gate 96 goes false upon the occurrence of complementary clock output $\overline{A}$. At the same time, NAND gate 97 issues a false pulse labeled SELECT TOGGLE to the A/B select logic of the other clock. The output of gate 96 is applied to the clear input 99 fo a flip-flop 100. The present input 102 of the flip-flop is pulled up by source 103. As a result, the Q output of flip-flop 100 goes false, causing outputs 88-91 of the NAND gates 105 to go true. This is a selection of clock A, and corresponds with the arrangement of jumpers 93 for select logic 27 of clock A.

When the SWITCH signal is received and gate 96 produces a false output, inverter 98 applies a true input to NAND gate 107. If the clock system 10 is operating in an automatic mode, then the MANUAL input to inverter 108 will be false, and gate 107 will receive a second true input. As a result, a false DISABLE output will be generated by NAND gate 107 to the A/B select logic of the other clock.

If the circuit of FIG. 5 is the A/B select logic of the malfunctioning clock, it would receive both a SELECT TOGGLE and DISABLE signal from the select logic of the other clock. The SELECT TOGGLE would apply a false signal to the preset input 102 of flip-flop 100. Meanwhile, the source 110 would pull up on the clear input 99 of the flip-flop. The Q output of flip-flop 100 would go true, selecting clock B. This is appropriate, since the jumpers 93 are positioned to make the circuit of FIG. 5 be logic 27 of clock A.

As a precaution, the false DISABLE signal is applied to the clock input of flip-flop 111. With the J input of flip-flop 111 held high and the K input thereof held low, the $\overline{Q}$ output applies a false input to the NAND gates 105. This causes outputs 88-91 of the gates to become true. If the gates 105 are of the open collector type, then when they assume the true state, the gates to which they are connected in the A/B select logic of the other clock can determine the logical state of the output. This prevents a malfunctioning clock B card from failing in such a way that the outputs 88-91 are held low, continuing to select clock B despite the action of the clock A select logic.

The flip-flop 111 receives a false power-on-clear signal at its clear input 115. Flip-flop 102 receives a true power-on-clear signal at its clock input. With these signals, the clock system 10 starts with clock A selected to provide the system output.

Figure 6:
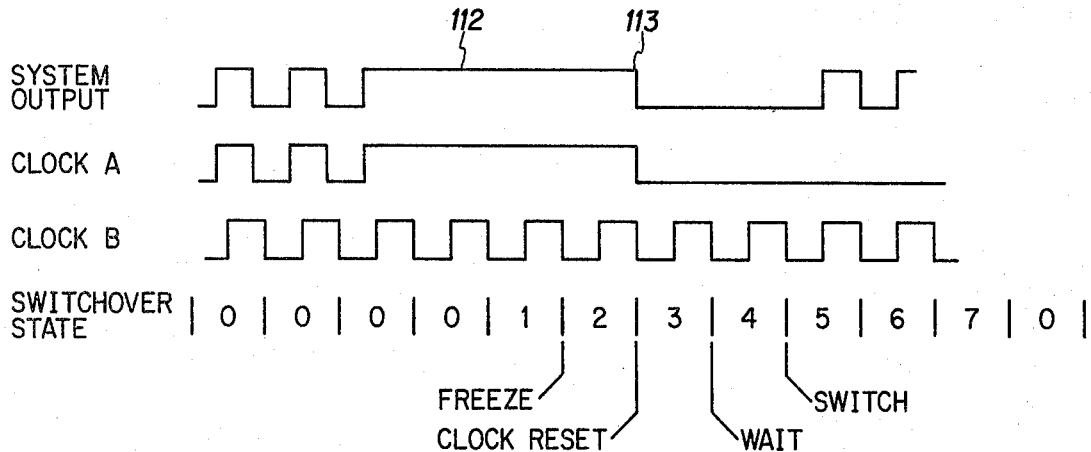
FIG. 6 is a set of waveforms illustrating the operation of the system of FIG. 1.

The overall operation of the clock system 10 is illustrated by the waveforms in FIG. 6. Below the waveforms are indicated the states of the switchover sequence control 25. In the first few cycles of the waveform, it can be seen that clock A and clock B are both properly functioning and not synchronized with each other. The output of clock A is selected as the system output, as seen by the time coincidence of the system output and that of clock A.

At approximately point 112 in the waveforms, there is a malfunction in clock A causing its output and the system output to lock in the true state. After a short period, the error detection logic 22 of clock B detects the error and signals switchover sequence control 25 to begin the switchover to clock B. At the beginning of state two, the output of clock A is frozen by a signal from switchover sequence control 25.

Freezing the output of the defective clock is an important advantage of the clock system of the invention. For example, if only a portion of the multiple outputs of the clock are defective, then a processor served by these outputs would be getting some good clock pulses and some erroneous ones. This could well drive the processor to a very confused state.

At the beginning of state three, the output of the defective clock is reset to a known state, namely low, as seen at time 113 in the waveforms.

During state four, no change is instituted. This wait is to ensure that the system output does not exhibit state transitions which occur more frequently than in the proper clock period. A device utilizing the system output could interpret the transitions as clock pulses occurring more frequently than the proper rate. The utilizing device can well contain logic with propagation delays that are designed satisfactorily with respect to the proper clock rate, but which would be driven to an indeterminate state by clock pulses unusually close together.

At the beginning of state five, the SWITCH signal to A/B select logic 28 causes it to implement the selection of the output of clock B as the system output. This is seen in the system output waveform of FIG. 6, as it resumes, but this time in time coincidence with clock B.

Although preferred embodiments of the invention have been described in detail, it is to be understood that various changes, substitutions and alterations can be made therein, without departing from the spirit and scope of the invention as defined by the appended claims.

I claim:

1. A clock system comprising:
   first and second electronic clocks, not synchronized with each other, each including an output signal selectable as the present output of the system;
   means for selecting one of said signals;
   first means associated with said first clock for detecting errors in the operation of said first clock and of said second clock;
   second means associated with said second clock for detecting errors in the operation of said second clock and of said first clock;
   first switchover means, responsive to the detection by said first error detecting means of an error in the operation of the second clock, for switching said selecting means so that the output signal of the first clock becomes the system output, if the output signal of the second clock is said present system output; and
   second switchover means, responsive to the detection by said second error detecting means of an error in the operation of the first clock, for switching said selecting means so that the output signal of the second clock becomes the system output, if the output signal of the first clock is said present system output, each of said switchover means including means for switching at a time which ensures that the inverval between pulses in the system output is greater than a predetermined period.

2. A clock system comprised of first and second circuits capable of being separately powered and not synchronized with each other, each circuit including:
   an electronic clock;
   means for selecting the clock in one of said circuits to have a signal thereof as a present output of the system;
   means for detecting errors in the operation of the clock in the same circuit and the clock of the other circuit; and
   switchover means responsive to the detection by said error detecting means of an error in the operation of the clock of the other circuit, for switching so that a signal of the clock of the same circuit becomes the system output, if the clock of the other circuit was said one clock selected to be a present system output, said switchover means including means for switching at a time which ensures that the interval between pulses in the system output is greater than a predetermined period.

3. The clock system of claim 1, wherein each of said clocks includes an oscillator, and
   said first means for detecting errors includes means for detecting errors in the operation of the oscillator of said first clock, and
   said second means for detecting errors includes means for detecting errors in the operation of the oscillator of said second clock.

4. The clock system of claim 1, wherein said first means for detecting errors includes means for detecting errors in the output signal of said first clock, and said second means for detecting errors includes means for detecting errors in the output signal of said second clock.

5. The clock system of claim 4 wherein each of said clocks includes an oscillator, and
   said first means for detecting errors includes means for detecting errors in the operation of the oscillator of said first clock, and
   said second means for detecting errors includes means for detecting errors in the operation of the oscillator of said second clock.

6. The system of claim 5, wherein
   said first means for detecting errors includes means responsive to errors in the output signal of the first clock or errors in the operation of the oscillator of said first clock, for generating a first signal indicating failure; and
   said second means for detecting errors includes means, responsive to errors in the output signal of the second clock or errors in the operation of the oscillator of the second clock, for generating a second signal indicating failure.

7. The system of claim 1, wherein each of said clocks includes an oscillator, and
said first means for detecting errors includes means for detecting errors in the operation of the oscillator of said second clock, and
said second means for detecting errors includes means for detecting errors in the operation of the oscillator of said first clock.

8. The system of claim 1, wherein each of said first and second means for detecting errors includes means for generating a signal indicative of a failure of the clock associated therewith, and
said first means for detecting errors includes means for receiving the signal indicating failure of said second clock, and
said second means for detecting errors includes means for receiving said signal indicating failure of said first clock.

9. The system of claim 7, wherein each of said first and second means for detecting errors includes means for generating a signal indicative of a failure of the clock associated therewith, and
said first means for detecting errors includes means for detecting said signal indicating failure of said second clock, and
said second means for detecting errors includes means for detecting said signal indicating failure of said first clock.

10. The system of claim 9, wherein said first means for detecting errors includes means for signaling said first switchover means that an error has been detected in the operation of the second clock, when either an error is detected in the operation of the oscillator of said second clock or when said signal is detected which indicates failure of said second clock, and
said second means for detecting errors includes means for signaling said second switchover means that an error has been detected in the operation of the first clock, when either an error has been detected in the operation of the oscillator of the first clock or said signal is detected which indicates failure of the first clock.

11. The system of claim 1, wherein
said first switchover means includes means for stopping the output signal of the second clock from changing value preparatory to switching the output signal of the first clock to become the output of said clock system, and
said second switchover means includes means for stopping the output signal of the first clock from changing value, preparatory to switching the output signal of the second clock to become the output of said clock system.

12. The system of claim 11, wherein
said first switchover means includes means for waiting at least one cycle of the output signal of the first clock, between said stopping and the switching of the output signal of the first clock to become the system output, and
said second switchover means includes means for waiting at least one cycle of the output signal of the second clock, between said stopping of the first clock and the switching of the output of the second clock to become the system output,
whereby said means for waiting ensures that the interval between pulses in the system output is greater than a predetermined period.

13. The system of claim 12, wherein said first switchover means includes means for resetting, after said waiting of the first switchover means, the output of said second clock to a preselected value, and
said second switchover means includes means for resetting, after said waiting of the second switchover means, the output signal of said first clock to a preselected value.

14. The system of claim 13, wherein
said first switchover means includes means for waiting at least one cycle of the output signal of said first clock between said resetting by the first switchover means and switching the output signal of the first clock to become the output of the system, and
said second switchover means includes means for waiting at least one cycle of the output signal of the second clock between said resetting by the second switchover means and the switching of the output signal of the second clock to become the output of the system,
whereby said waiting after said resetting ensures that the interval between pulses in the system output is greater than a predetermined period.

15. The system of claim 1, wherein said means for selecting includes first and second select circuits responsive to said switching of the first and second switchover means, respectively,
said first select circuit including means for disabling said second select circuit upon said switching by the first switchover means, and
said second select circuit including for disabling said first select circuit, upon said switching by said second switchover means.

16. The system of claim 5, wherein said first means for detecting errors includes means for signaling said first switchover means that an error has been detected in the operation of the second clock, when either an error is detected in the operation of the oscillator of said second clock or when said signal is detected which indicates failure of said second clock, and
said second means for detecting errors includes means for signaling said second switchover means that an error has been detected in the operation of the first clock, when either an error has been detected in the operation of the oscillator of the first clock or said signal is detected which indicates failure of the first clock.

17. The system of claim 4, wherein said means for detecting errors in the output signal of said first clock includes a parity detector having multiple signal conductor inputs, each carrying said first clock output signal, when operating properly.

18. The system of claim 2, wherein said signals of said first and second circuits are connectable to a third circuit which is to use one of said signals, and each of said means for selecting includes a select output connectable to said third circuit to command, at said third circuit, which of said signals is to be used thereby.

* * * * *